United States Patent [19]

Kato

[11] Patent Number: 4,639,095
[45] Date of Patent: Jan. 27, 1987

[54] TELEPHOTO ZOOM LENS

[75] Inventor: Masatake Kato, Tokyo, Japan

[73] Assignee: Canon Kabushiki Kaisha, Tokyo, Japan

[21] Appl. No.: 491,053

[22] Filed: May 3, 1983

[30] Foreign Application Priority Data

May 17, 1982 [JP] Japan .................. 57-82643

[51] Int. Cl.⁴ .................................. G02B 15/163
[52] U.S. Cl. ............................. 350/427; 350/423
[58] Field of Search .................. 350/423, 427, 428

[56] References Cited

U.S. PATENT DOCUMENTS

| 4,240,700 | 12/1980 | Ogawa et al. | 350/423 |
| 4,449,791 | 5/1984 | Terasawa et al. | 350/427 |
| 4,478,496 | 10/1984 | Kato | 350/427 |
| 4,501,475 | 2/1985 | Fujita et al. | 350/427 |

FOREIGN PATENT DOCUMENTS

| 2828215 | 2/1979 | Fed. Rep. of Germany | 350/427 |
| 1434747 | 2/1966 | France | 350/427 |

Primary Examiner—John K. Corbin
Assistant Examiner—Scott J. Sugarman
Attorney, Agent, or Firm—Toren, McGeady & Goldberg

[57] ABSTRACT

A telephoto zoom lens having three lens groups of which the 1st, counting from front, is of positive refractive power, the 2nd is of negative refractive power, and the 3rd is of positive refractive power, wherein the aforesaid 1st and 2nd lens groups are made movable to change the focal length of the entire system. Numerical limits or ranges for certain designated features of the lens system, for example, the differential relation in which the 1st and 2nd lens groups move when zooming, their focal lengths, and the image magnification of the 2nd lens group, are properly specified so as to achieve good stability of aberration correction throughout the range.

3 Claims, 31 Drawing Figures

FIG.5-1    FIG.5-2    FIG.5-3

F NO/5.6     W=15.5°     W=15.5°
S.C
d-LINE  g-LINE     ΔS  ΔM f=77.85

-0.40   0.40    -0.40   0.40    -5.00   5.00
SPHERICAL ABERRATION  ASTIGMATISM   DISTORTION(%)
SINE CONDITION

FIG.5-4    FIG.5-5    FIG.5-6

F NO/5.6     W=8.41°     W=8.41°
d-LINE  g-LINE
S.C               ΔM  ΔS f=146.25

-0.40   0.40    -0.40   0.40    -5.00   5.00
SPHERICAL ABERRATION  ASTIGMATISM   DISTORTION(%)
SINE CONDITION

FIG.5-7    FIG.5-8    FIG.5-9

F NO/5.6     W=6.42°     W=6.42°
d-LINE
        g-LINE     ΔS
        S.C      ΔM f=192.21

-0.40   0.40    -0.40   0.40    -5.00   5.00
SPHERICAL ABERRATION  ASTIGMATISM   DISTORTION(%)
SINE CONDITION

FIG.6-1

F NO/4.5
d-LINE
S.C
g-LINE
f=77.85
-0.40 0.40
SPHERICAL ABERRATION
SINE CONDITION

FIG.6-2

W=15.5°
ΔS
ΔM
-0.40 0.40
ASTIGMATISM

FIG.6-3

W=15.5°
-5.00 5.00
DISTORTION(%)

FIG.6-4

F NO/4.5
d-LINE
g-LINE
S.C
f=139.43
-0.40 0.40
SPHERICAL ABERRATION
SINE CONDITION

FIG.6-5

W=8.82°
ΔS
ΔM
-0.40 0.40
ASTIGMATISM

FIG.6-6

W=8.82°
-5.00 5.00
DISTORTION(%)

FIG.6-7

F NO/4.5
g-LINE
d-LINE
S.C
f=192.34
-0.40 0.40
SPHERICAL ABERRATION
SINE CONDITION

FIG.6-8

W=6.42°
ΔS
ΔM
-0.40 0.40
ASTIGMATISM

FIG.6-9

W=6.42°
-5.00 5.00
DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

TELEPHOTO ZOOM LENS

BACKGROUND OF THE INVENTION

1. Field of the Invention

This invention relates to telephoto zoom lenses, and more particularly, to telephoto zoom lenses having a range of magnification of about 3 with a minimized bulk and size.

2. Description of the Prior Art

In the past, the telephoto type has found its use in many zoom lenses. For example, the zoom lenses proposed in U.S. Pat. Nos. 4,223,981, 4,240,699 and 4,350,416 and Japanese Laid-Open Patents Application No. Sho 51-37247, 51-63635, 52-56946 and 53-131852 are generally constructed in the form of four lens components, or, from front to rear, a 1st component which is held stationary during zooming and is axially movable for focusing, a 2nd component which axially moves to change the focal length of the entire lens system, a 3rd component which axially moves in differential relation to the 2nd component so as to maintain the constant position of the image plane, and a 4th component which is held stationary during zooming and is composed of an image forming lens group in the rear of the aforesaid 1st to 3rd components to satisfy a desired focal length and position of the image point.

Of the zoom lenses of such configuration, those which have an image angle range beginning with 33°–38° for the wide angle positions and a zoom ratio of about 3 upon consideration of the degree of minimization of the bulk and size of the lens system in terms of the ratio of the total length (distance from the front vertex to the image plane) to the focal length, or the telephoto ratio, were taken at a value of as large as unity, and even in the shortest ones, at about 0.9.

In this manner, the conventional zoom lens, because the 1st lens component performing only the focusing function and made stationary during zooming and because it takes the form that the total length of the lens system is maintained constant as the focal length varies from the wide angle side to the telephoto side, tends to become relatively longer in the longitudinal direction.

On the other hand, there have been proposed a zoom lens having the 1st component made movable to change the image magnification as, for example, disclosed in U.S. Pat. No. 4,232,942 and Japanese Laid-Open Patent Application No. Sho 53-142251 and Japanese Patent Publication No. Sho 4923911. But, because these known zoom lenses are of the optically compensated type and since it is necessary that the shift of the image plane due to zooming as an error may fall within the depth of field, the total movement of the zoom components is unavoidably increased, and a valuable increase in the zoom ratio is difficult to achieve. Therefore, the conventional zoom types are not suited for a high-range, small-sized zoom lens.

SUMMARY OF THE INVENTION

It is an object of the present invention to shorten the telephoto zoom lens in the longitudinal direction and to provide a telephoto zoom lens in which a component that moves to change the image magnification is constructed with two lens groups. Accordingly the lens structure is very simplified and the total length of the lens system at the wide angle position is shortened.

To achieve this, the feature of the invention is the construction and arrangement of the components in such a way that the lens system has three lens groups of which the 1st, counting from the front, is of positive refractive power, the 2nd is of negative refractive power, and the 3rd is of positive refractive power, the 1st and 2nd lens groups being axially moved in differential relation to each other to change the focal length of the entire system, whereby letting $\xi$ and $\eta$ denote respectively the amounts of movement of the 1st and 2nd lens groups as measured from the wide angle side and taking the direction from front to rear as positive, a condition that the ratio $d\eta/d\xi$ at a zooming station for the longest focal length lies in the following range:

$$0.4 < (-d\eta/d\xi) < 5.0 \ldots \tag{1}$$

or a condition that the image magnification $\beta_{2T}$ at a zooming station for the longest focal length lies in the following range:

$$0.28 < \beta_{2T2} < 0.84 \ldots \tag{2}$$

is satisfied.

BRIEF DESCRIPTION OF THE DRAWINGS

FIGS. 5-1 through -9, FIGS. 6-1 through -9 and FIGS. 7-1 through -9 are graphic representations of all aberrations of the lenses of FIGS. 2, 3 and 4 respectively.

DETAILED DESCRIPTION OF THE PREFERRED EMBODIMENTS

Figure 1:
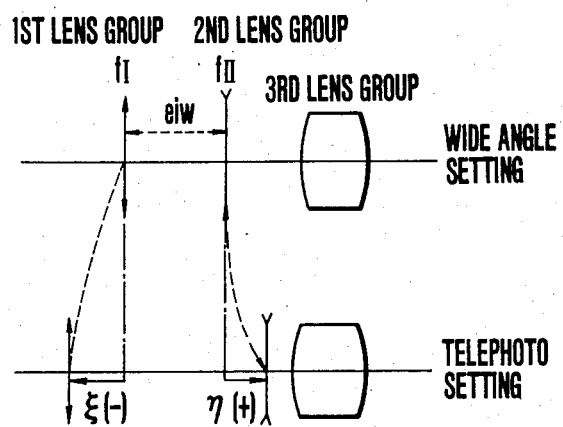
FIG. 1 is a schematic diagram illustrating the predesign of the telephoto zoom lens of the invention.
Figure 2:
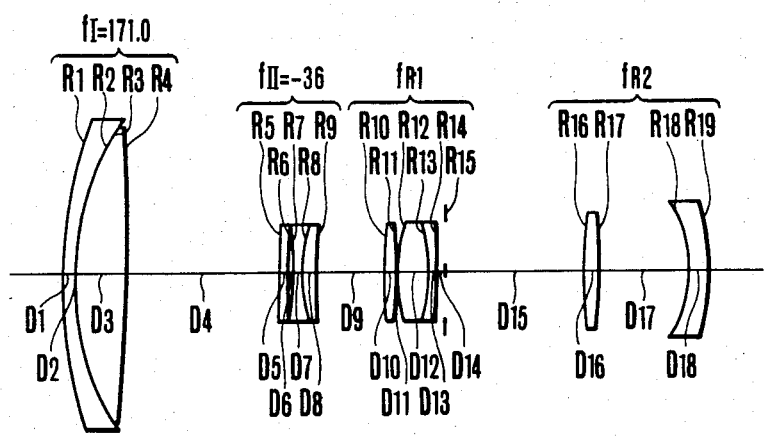
FIGS. 2, 3 and 4 are lens block diagrams of embodiment 1, embodiment 2 and embodiment 3 of the invention respectively.
Figure 3:
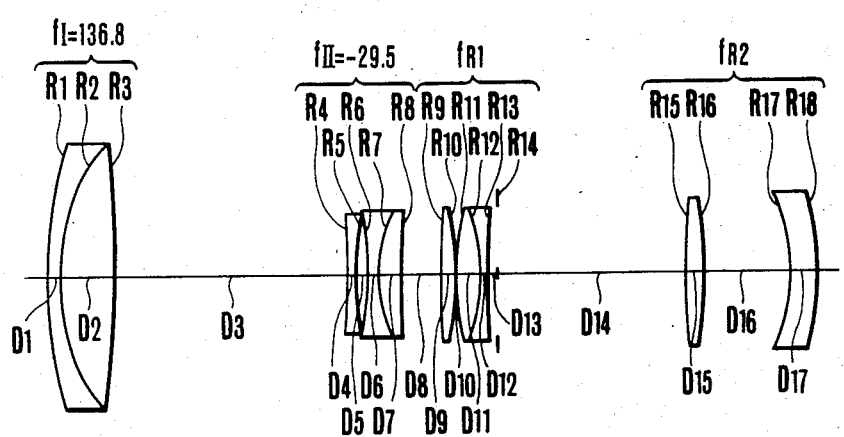
Figure 4:
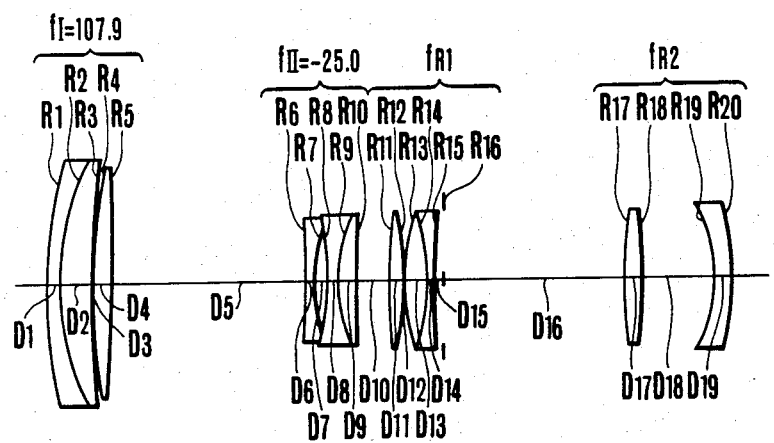
Figures 1, 7:
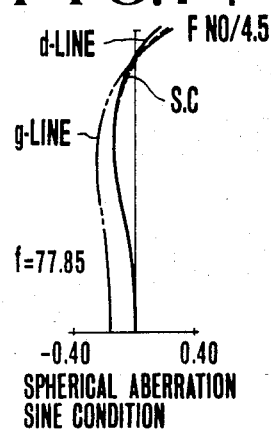
Figures 2, 7:
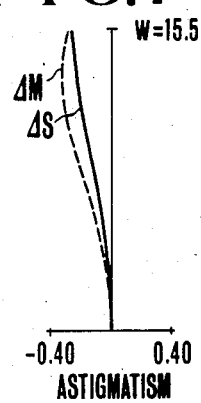
Figures 3, 7:
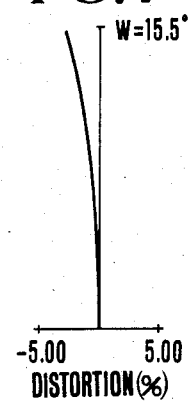
Figures 4, 7:
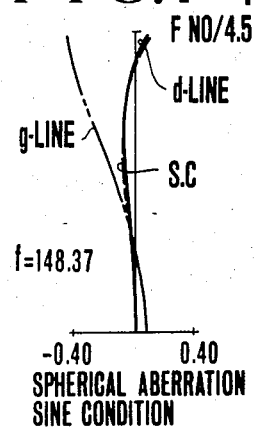
Figures 5, 7:
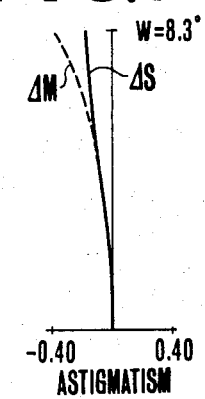
Figures 6, 7:
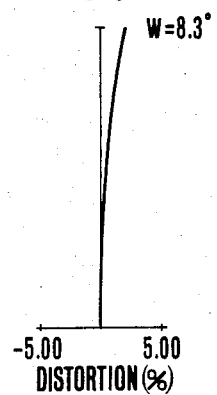
Figure 7:
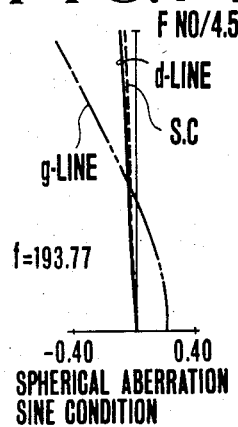
Figures 7, 8:
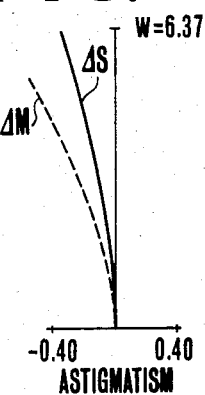
Figures 7, 8, 9:
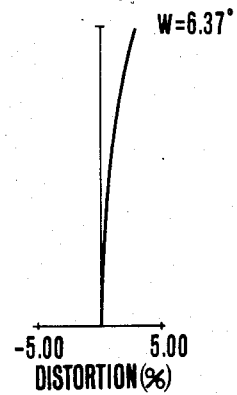

FIG. 1 schematically illustrates a telephoto zoom lens system according to the invention, comprising, from front to rear, 1st to 3rd lens groups arranged on an optical axis, the 1st and 2nd lens groups constituting a varifocal system and the 3rd lens group constituting a stationary or image forming system. In FIG. 1, the focal lengths of the 1st and 2nd lens groups are denoted by fI and fII respectively, the interval between the principal points of the 1st and 2nd lens groups when in the wide angle position by e'lw, and the amounts of movement of the 1st and 2nd lens groups from the wide angle position as the start point by $\xi$ and $\eta$ respectively, where it is stipulated that the amount of movement shall be given the positive sign when it is measured along the optical axis from front to rear.

The 1st lens group has a positive focal length and axially moves forward as zooming is performed from the wide angle to the telephoto side, and the 2nd lens group having a negative focal length axially moves rearward as the 1st lens group moves forward.

In general, for one of the designated features of the zoom lens, it is of great importance that the ratio of the speed of movement of the 2nd lens group to that of movement of the 1st lens group at stations for the longer focal lengths, or $d\eta/d\xi$, is appropriately specified. If this ratio $d\eta/d\xi$ is taken at too large a value, the precisional accuracy in manufacturing the cam provided in the mechanical mountings for the lens becomes so severe that economical manufacturing is difficult, and further the torque of moving the lens group in accordance with the cam becomes so irregular that a smooth zooming operation is difficult to perform.

In the zoom lens according to the present invention, for that designated feature, $d\mu/d\xi$, are given the above-stated numerical limits of inequalities (1). If the designated feature falls within this specified range, a desired increase in the zoom ratio is attained, and the tolerance for manufacturing the control cams is moderated, thus achieving the possibility of realizing a small-sized telephoto zoom lens. In more detail, when the lower limit of inequalities of condition (1) is exceeded, the magnification changing effect of the 2nd lens group is lessened with the result that the total movement of the zoom group has to be increased to obtain the equivalent zoom ratio, leading to objectionably increasing the bulk and size of the entire lens system. When the upper limit of inequalities of condition (1) is exceeded, the precision accuracy of the cam is increased so that it becomes difficult to manufacture the cam economically.

It is to be noted that the factor, $d\eta/d\xi$, in condition (1) is expressed in terms of the above-described various parameters by putting $$Q = \frac{-fII^2}{e'1w - fI - fII}$$

and $$P = e'1w - fI - fII + Q$$

as $$d\eta/d\xi = \frac{\eta + Q}{2\eta - \xi + P}$$

By satisfying the above-stated condition, the object of the invention for the telephoto zoom lens can be accomplished. Though the designated feature of the lens system has been defined by using the ratio of the speeds of movement of the 1st and 2nd lens groups at the telephoto positions, it is also possible, instead of the speed ratio, to use the image magnification of the 2nd lens group at the telephoto positions as that factor when equivalent improved results on the telephoto zoom lens of the invention are attained. That is, from front to rear, a 1st lens group of positive refractive power, a 2nd lens group of negative refractive power, and a 3rd lens group of positive refractive power constitute the zoom lens wherein the aforesaid 1st lens group and the aforesaid 2nd lens group are made movable to effect change of the focal length of the entire system, whereby the above-stated inequalities of condition (2) for the image magnification $\beta_{2T}$ of the 2nd lens group at the telephoto position are satisfied. The factor $\beta_{2T}$ in condition (2) is defined by the division of the reduced angle of incidence, $\alpha$, on the 2nd lens group by the reduced angle of emergence, $\alpha'$, from the 2nd lens group.

When the upper limit of the inequalities of condition (2) is exceeded, the precisional accuracy of the cam slot on the lens barrel becomes severe and the difficulty of manufacturing is increased. When the lower limit is exceeded, the magnification changing effect of the 2nd lens group is lessened with increase in the total movement for obtaining the required zoom ratio. Thus, the bulk and size of the entire lens is objectionably increased.

Though the foregoing conditions when satisfied suffice in achieving the telephoto zoom lens of the invention, it is in the present invention that to facilitate improvements of the aberration correction of the telephoto zoom lens of reduced size, it is preferred to satisfy the following various conditions:

$$-1.50 < \frac{fI + fII - e'1w}{Z \cdot fII} < -1.09 \quad (3)$$

$$0.12 < \frac{-fII}{fT} < 0.19 \quad (4)$$

where fI and fII are the focal lengths of the aforesaid 1st and 2nd lens groups respectively, e'1w is the interval between the principal points of the aforesaid 1st lens group and the aforesaid 2nd lens group when in the wide angle position, fT is the longest focal length of the entive system, and Z is the zoom ratio.

Inequalities of condition (3) concern with the refractive power arrangement of the varifocal system composed of the 1st and 2nd lens groups. When the upper limit is exceeded, the gradients of the control cams for the 1st and 2nd lens groups become advantageously easy, but because of a decrease in the total movement, as the difference between the total lengths of the lens system for the wide angle and telephoto positions becomes small, a much-desired decrease of the total length in the wide angle position cannot be achieved. On the other hand, when the lower limit is exceeded, the total length of the lens system in the telephoto position has, despite the increase of the total movement, to be shortened by considerably strengthening the refractive power of the 3rd lens group, thereby the number of lens elements in the 3rd lens group is increased, and good correction of aberrations becomes difficult to achieve.

Inequalities of condition (4) concern the focal length of the 2nd lens group and are given for facilitating good correction of aberrations over the entire zooming range. When the upper limit is exceeded, though being advantageous at the aberration correction, the desired increase in the zoom ratio calls for an unduly large increase in the total length of the 2nd lens group, thus contributing to a cause of hindering reduction of the bulk and size of the lens system. When the lower limit is exceeded, the refractive power of the 2nd lens group becomes too strong to well correct aberrations with ease. Particularly, the astigmatism varies to a large extent with zooming and the tolerances for the optical eccentricity and the zoom control cams become very severe so that it is difficult to manufacture the zoom lenses economically.

According to the invention, a telephoto zoom lens of the above-described general configuration should have the following other features when the imaging performance is maintained excellent over the extended range with the limitation of the bulk and size to a minimum.

The 1st lens group has at least one positive lens and one negative lens, the aforesaid 2nd lens group has at least one negative lens and at least one cemented lens consisting of a negative lens and a positive lens, and the aforesaid 3rd lens group is considered as comprising a 3-1st subgroup or front subgroup and a 3-2nd subgroup or rear subgroup, said 3-1st subgroup having at least two positive lenses and one negative lens, and said 3-2nd subgroup having at least one positive lens and one negative lens.

Letting Ra denote the radius of curvature of the front surface of the 1st lens element counting from front in the aforesaid 1st lens group, Rb the radius of curvature of the front surface of the 1st lens element counting from front in the aforesaid 2nd lens group, Rc te radius of curvature of the cemented surface of the doublet in the aforesaid 2nd lens group, Rd the radius of curvature of the rear surface of the last lens element in the aforesaid 3-2nd subgroup, N2 the average value of the sum of the refractive indices of the glasses of the negative lens elements in the aforesaid 2nd lens group, and Nb the difference between the refractive indices of the glasses of the two lens elements in the cemented lens in the aforesaid 2nd lens group, the following conditions are satisfied:

$$0.6 < (Ra/fI) < 0.9 \ldots \quad (5)$$

$$-12.0 < (Rb/fII) < 7.0 \ldots \quad (6)$$

$$0.7 < |(Rc/fII)| < 1.2 \ldots \quad (7)$$

$$Rd < 0 \ldots \quad (8)$$

$$1.60 < N2 < 1.85 \ldots \quad (9)$$

$$0.04 < Nb < 0.16 \ldots \quad (10)$$

Each of the above-stated conditions will next be explained.

Inequalities of condition (5) concerns the radius of curvature of the front surface of the 1st lens. In general, as the refractive power of the 1st lens group weakens, the radius of curvature of said lens surface also becomes large. When its value becomes large beyond the upper limit of the inequalities of condition, over-correction of spherical aberration results. On the other hand, when the lower limit is exceeded, the pincushion distortion in the telephoto positions becomes difficult to correct.

Inequalities of condition (6) concern with the radius of curvature of the front surface of the 1st lens in the 2nd lens group, and are given for minimizing the variation with zooming of spherical aberration and coma. When the upper limit is exceeded, the variation of spherical aberration becomes large, and large positive-going coma is produced in the telephoto positions. On the other hand, when the lower limit is exceeded, the variation of coma becomes small, but large zonal spherical aberration is produced in the wide angel positions.

Inequalities of condition (7) concern with the radius of curvature of the adjoining surface of the cemented lens in the 2nd lens group and are given for good correction of spherical aberration, Petzval sum lateral chromatic aberration. When the upper limit is exceeded, over-correction of spherical aberration results, the Petzval sum becomes small, and over-correction of lateral chromatic aberration for g-line results in the telephoto positions, so that as a whole the width of colored blur is objectionably widened. On the other hand, when the lower limit is exceeded, the Petzval sum becomes large. When the refractive power of the 2nd lens group is strengthened, this works in a favorable direction. But large under-correction of spherical aberration results particularly regarding that for the g-line.

Inequality of condition (8) represents the formation of the rear surface of the last lens in the 3-2nd lens group to a convex shape toward the rear and is given for good correction of pincushion distortion in the telephoto positions.

Inequalities of condition (9) concern the refractive indices of the negative lenses in the 2nd lens group, and specify a range within which their arithmetic means is to fall. When the upper limit is exceeded, with regard to the Petzval sum, it is advantageous, but the longitudinal chromatic aberration and lateral chromatic aberration vary to large extent. On the other hand, when the lower limit is exceeded, the radius of curvature of each lens surface in the 2nd lens group becomes too small to reduce the variation of aberrations with ease.

Inequalities of condition (10) is related to the inequalities of condition (7), and concern the difference in the refractive index between the positive and negative lenses constituting the cemented lens in the 2nd lens group. When the upper limit is exceeded, the variation of coma is advantageously reduced, but the variation of astigmatism becomes large. On the other hand, when the lower limit is exceeded, conversely the variation of astigmatism is advantageously reduced, but the variation of coma is increased objectionably.

It is to be noted that in the telephoto zoom lens according to the invention, it is preferable to give the 1st lens group the focusing function, but focusing may be otherwise performed by moving part of either the 2nd or the 3rd lens group. The use one of the 2nd lens group and that follows as the focusing lens group shortens the total focusing movement, giving an advantage on the focusing control mechanism.

Next, numerical examples of the invention are shown. In the numerical examples, Ri is the radius of curvature of the i-th lens surface counting from front; Di is the i-th lens thickness and air separation counting from front; Ni and $\nu i$ are refractive index and Abbe number of the glass of the i-th lens counting from front.

Notice that the R15 of Example 1, the R14 of Example 2 and R16 of Example 3 are stops.

| Example 1 | | | |
|---|---|---|---|
| f = 77.8–192.2 | FNo. 1:5.6 | $2\omega$ = 34.5°–14.3° | |
| R1 = 116.88 | D1 = 2.40 | N1 = 1.80518 | $\nu$1 = 25.4 |
| R2 = 64.39 | D2 = 0.50 | | |
| R3 = 66.42 | D3 = 8.64 | N2 = 1.65844 | $\nu$2 = 50.9 |
| R4 = −425.98 | D4 = Variable | | |
| R5 = 391.44 | D5 = 1.45 | N3 = 1.63854 | $\nu$3 = 55.4 |
| R6 = 64.59 | D6 = 1.32 | | |
| R7 = −52.41 | D7 = 1.45 | N4 = 1.69350 | $\nu$4 = 53.2 |
| R8 = 28.01 | D8 = 2.64 | N5 = 1.84666 | $\nu$5 = 23.9 |
| R9 = 75.38 | D9 = Variable | | |
| R10 = 198.86 | D10 = 2.00 | N6 = 1.69350 | $\nu$6 = 53.2 |
| R11 = −132.94 | D11 = 0.15 | | |
| R12 = 43.64 | D12 = 6.00 | N7 = 1.66672 | $\nu$7 = 48.3 |
| R13 = −32.60 | D13 = 1.50 | N8 = 1.84666 | $\nu$8 = 23.9 |
| R14 = −217.27 | D14 = 1.00 | | |
| R15 = Stop | D15 = 27.15 | | |
| R16 = 109.56 | D16 = 2.79 | N9 = 1.58904 | $\nu$9 = 53.2 |
| R17 = −114.36 | D17 = 17.35 | | |
| R18 = −24.67 | D18 = 3.39 | N10 = 1.62299 | $\nu$10 = 58.2 |
| R19 = −44.22 | | | |

| f | 77.85 | 146.25 | 192.21 |
|---|---|---|---|
| D4 | 1.224 | 60.247 | 76.309 |
| D9 | 16.5 | 7.477 | 1.415 |

$$\frac{fI + fII - e'1w}{Z \cdot fII} = -1.4198 \qquad \frac{-fII}{fT} = 0.187$$

$$-\frac{d\eta}{d\xi} = 0.984$$

$$\beta_{2T2} = 0.496$$

| Example 2 | | | |
|---|---|---|---|
| F = 77.8–192.3 | FNo. 1:4.5 | $2\omega$ = 34.5°–14.3° | |
| R1 = 88.53 | D1 = 2.60 | N1 = 1.80518 | $\nu$1 = 25.4 |
| R2 = 44.77 | D2 = 9.29 | N2 = 1.63930 | $\nu$2 = 44.9 |
| R3 = −326.47 | D3 = Variable | | |

-continued

Example 2

F = 77.8–192.3    FNo. 1:4.5    $2\omega = 34.5°–14.3°$

| | | | |
|---|---|---|---|
| R4 = −194.61 | D4 = 1.45 | N3 = 1.77250 | ν3 = 49.6 |
| R5 = 60.70 | D5 = 2.39 | | |
| R6 = −53.90 | D6 = 2.50 | N4 = 1.77250 | ν4 = 49.6 |
| R7 = 27.34 | D7 = 4.13 | N5 = 1.84666 | ν5 = 23.9 |
| R8 = 188.93 | D8 = Variable | | |
| R9 = 208.90 | D9 = 2.57 | N6 = 1.69350 | ν6 = 53.2 |
| R10 = −65.14 | D10 = 0.15 | | |
| R11 = 46.92 | D11 = 4.80 | N7 = 1.67003 | ν7 = 47.3 |
| R12 = −37.23 | D12 = 1.53 | N8 = 1.84666 | ν8 = 23.9 |
| R13 = 1209.76 | D13 = 1.60 | | |
| R14 = Stop | D14 = 36.10 | | |
| R15 = 127.99 | D15 = 3.54 | N9 = 1.58913 | ν9 = 61.0 |
| R16 = −82.86 | D16 = 17.61 | | |
| R17 = −29.16 | D17 = 4.30 | N10 = 1.62280 | ν10 = 57.0 |
| R18 = −62.99 | | | |

| f | 77.85 | 139.43 | 192.34 |
|---|---|---|---|
| D3 | 1.562 | 44.622 | 59.598 |
| D8 | 14.8 | 7.740 | 1.674 |

$$\frac{fI + fII - e'lw}{Z \cdot fII} = -1.338 \qquad \frac{-fII}{fT} = 0.153$$

$$-\frac{d\eta}{d\xi} = 1.266$$

$$\beta_{2T2} = 0.559$$

Example 3

F = 77.8–193.8    FNo. 1:4.5    $2\omega = 34.5°–14.3°$

| | | | |
|---|---|---|---|
| R1 = 90.87 | D1 = 2.20 | N1 = 1.80518 | ν1 = 25.4 |
| R2 = 50.31 | D2 = 6.68 | N2 = 1.61484 | ν2 = 51.2 |
| R3 = 330.67 | D3 = 0.12 | | |
| R4 = 114.15 | D4 = 3.01 | N3 = 1.60311 | ν3 = 60.7 |
| R5 = −685.53 | D5 = Variable | | |
| R6 = −275.46 | D6 = 1.45 | N4 = 1.80400 | ν4 = 46.6 |
| R7 = 47.55 | D7 = 3.14 | | |
| R8 = −40.10 | D8 = 1.45 | N5 = 1.80400 | ν5 = 46.6 |
| R9 = 26.48 | D9 = 3.79 | N6 = 1.84666 | ν6 = 23.9 |
| R10 = 1790.39 | D10 = Variable | | |
| R11 = 266.51 | D11 = 2.66 | N7 = 1.69350 | ν7 = 53.2 |
| R12 = −60.96 | D12 = 0.15 | | |
| R13 = 47.49 | D13 = 4.63 | N8 = 1.67003 | ν8 = 47.3 |
| R14 = −38.51 | D14 = 1.29 | N9 = 1.84666 | ν9 = 23.9 |
| R15 = −1590.54 | D15 = 1.30 | | |
| R16 = Stop | D16 = 34.65 | | |
| R17 = 108.18 | D17 = 3.63 | N10 = 1.58913 | ν10 = 61.0 |
| R18 = −92.22 | D18 = 13.44 | | |
| R19 = −30.24 | D19 = 3.20 | N11 = 1.62374 | ν11 = 47.1 |
| R20 = −57.26 | | | |

| f | 77.85 | 148.37 | 193.77 |
|---|---|---|---|
| D5 | 2.373 | 37.119 | 46.104 |
| D10 | 14.0 | 6.255 | 1.269 |

$$\frac{fI + fII - e'lw}{Z \cdot fII} = -1.17 \qquad \frac{-fII}{fT} = 0.129$$

$$-\frac{d\eta}{d\xi} = 2.631$$

$$\beta_{2T2} = 0.725$$

What is claimed is:

1. A telephoto zoom lens comprising:
   three lens groups, said three lens groups being, from front to rear,
   a 1st lens group of positive refractive power, a 2nd lens group of negative refractive power, and a 3rd lens group of positive refractive power,
   said 3rd lens group being always stationary during zooming, said third lens group having a front sub-group of positive power, and a rear sub-group of positive power,
   said 1st lens group and said 2nd lens group being made movable in order to change the focal length of the entire system, whereby the ratio of the amounts of movement ($d\eta/d\xi$) at the focal length of the telephoto side satisfies the following condition:

$$0.4 < (-d\mu/d\xi) < 5.0$$

wherein the focal length of the wide angle side is taken as a start point, the positive sign is given when measuring from front to rear, and $\xi$ and $\eta$ denotes the amounts of movement of said 1st lens group and said 2nd lens group respectively and wherein said telephoto zoom lens satisfying the following conditions:

$$0.6 < (Ra/fI) < 0.9$$

$$-12.0 < (Rb/fII) < 7.0$$

$$0.7 < (Rc/fII) < 1.2$$

$$Rd < 0$$

$$1.60 < N2 < 1.85$$

$$0.04 < Nb < 0.16$$

where
Ra is the radius of curvature of the front lens surface of the 1st lens, counting from front, in said 1st lens group,
Rb is the radius of curvature of the front lens surface of the 1st lens, counting from front, in said 2nd lens group,
Rc is the radius of curvature of the cemented surface of the cemented lens in said 2nd lens group,
Rd is the radius of curvature of the rear lens surface of the last lens in said rear sub-group,
N2 is the arithmetic means of the refractive indices of the glasses of the negative lenses in said 2nd lens group, and
Nb is the difference between the refractive indices of the glasses of the two lenses of the cemented lens of said 2nd lens group.

2. A telephoto zoom lens according to claim 1, satisfying the following condition:

$$-1.50 < \frac{fI + fII - e'lw}{Z \cdot fII} < -1.09$$

$$0.12 < \frac{-fII}{fT} < 0.19$$

wherein fI and fII are the focal lengths of said 1st lens group and said 2nd lens group respectively, e'lw is the interval between the principal points of said 1st lens at the focal length of the wide angle side group and said 2nd lens group, fT is the focal length of the telephoto side, and Z is the zoom ratio.

3. A telephoto zoom lens according to claim 2, wherein,
said 1st lens group has at least one positive lens and negative lens, said 2nd lens group has at least one negative lens and at least one cemented lens of negative and positive lenses, said front sub-group has at least two positive lenses and one negative lens, said rear sub-group has at least one positive lens and negative lens.

* * * * *